Aug. 9, 1960
H. SCHNYDER
2,948,290
METHOD OF AND MECHANISM FOR THE ACTUATION OF A
QUICK-ACTION SHUT-OFF DEVICE FOR
PRESSURE-PIPE LINES
Filed Feb. 21, 1955
4 Sheets-Sheet 4
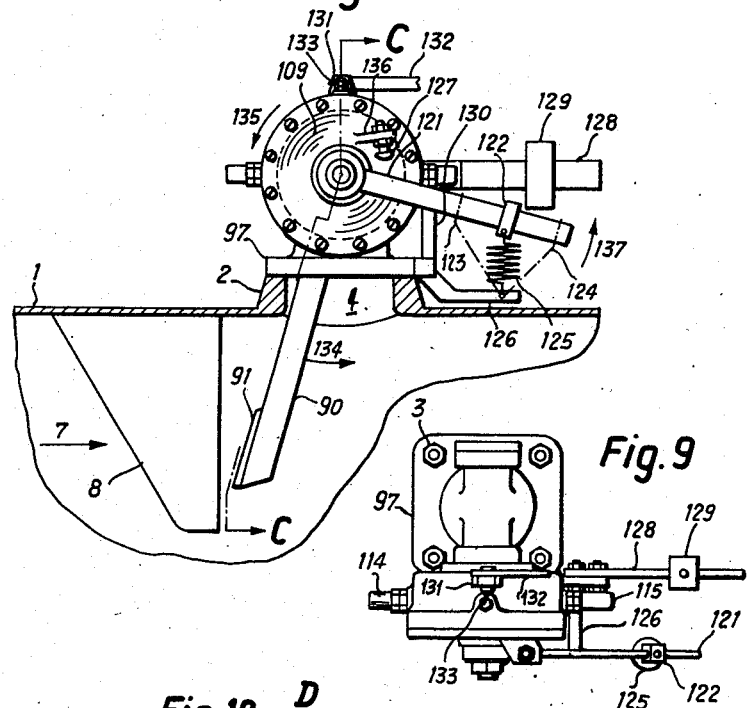
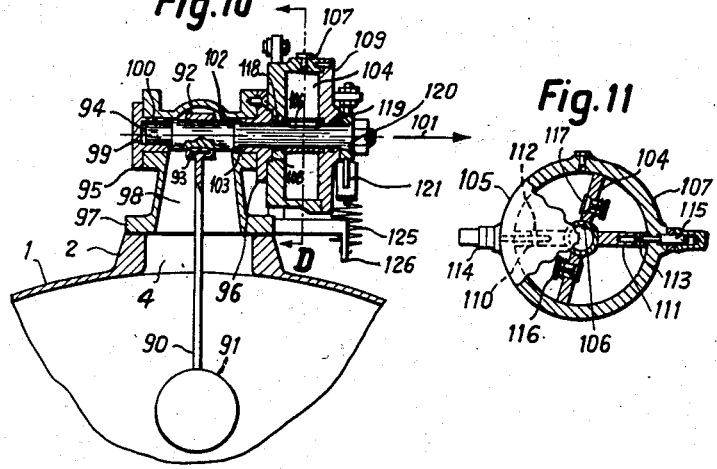
INVENTOR.
HANS SCHNYDER
BY United States Patent Office 2,948,290
Patented Aug. 9, 1960

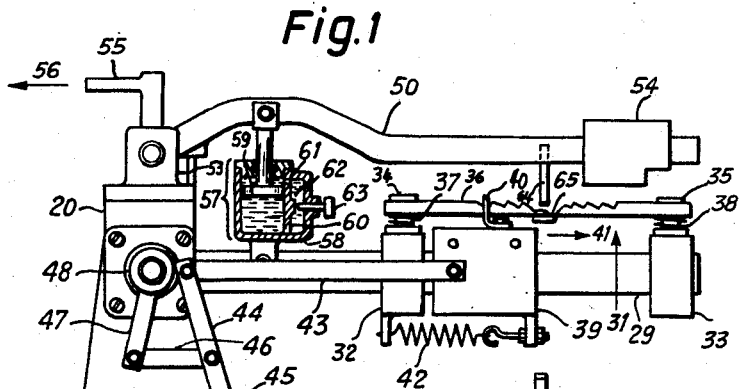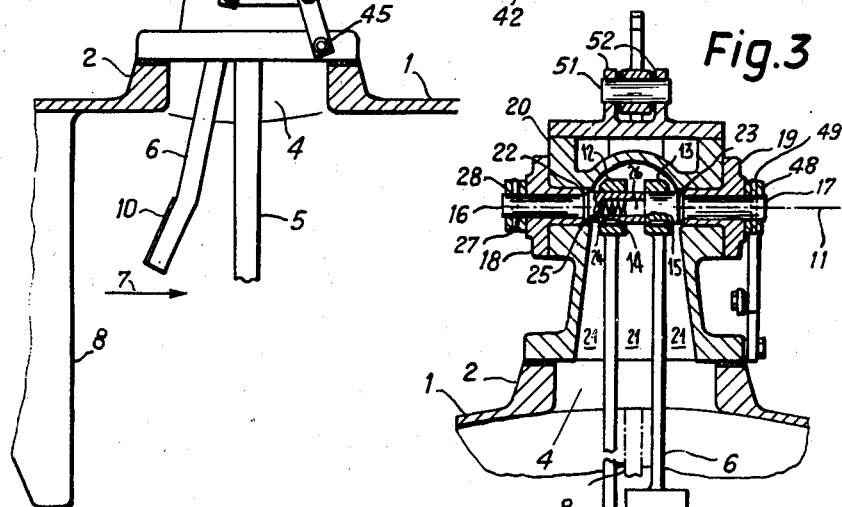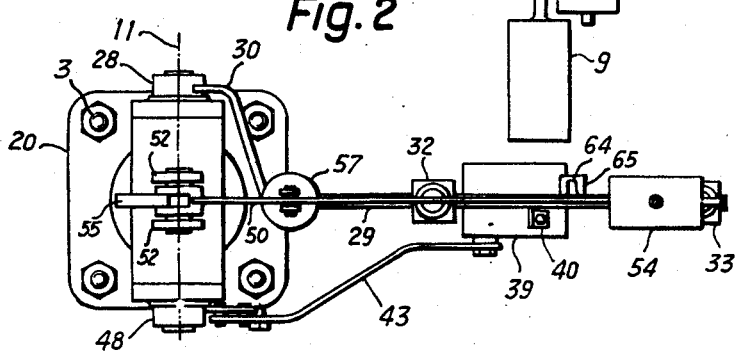

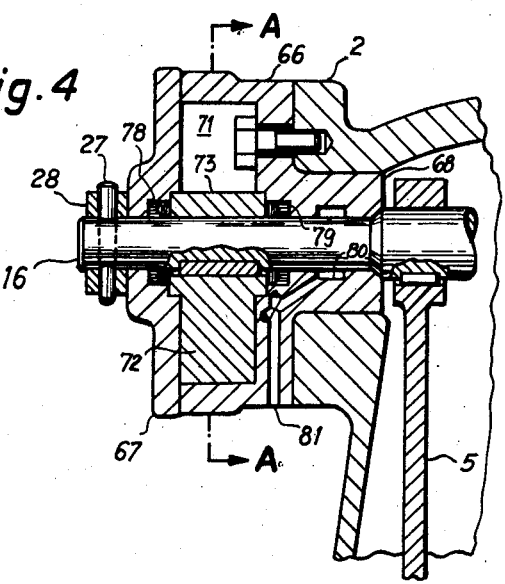
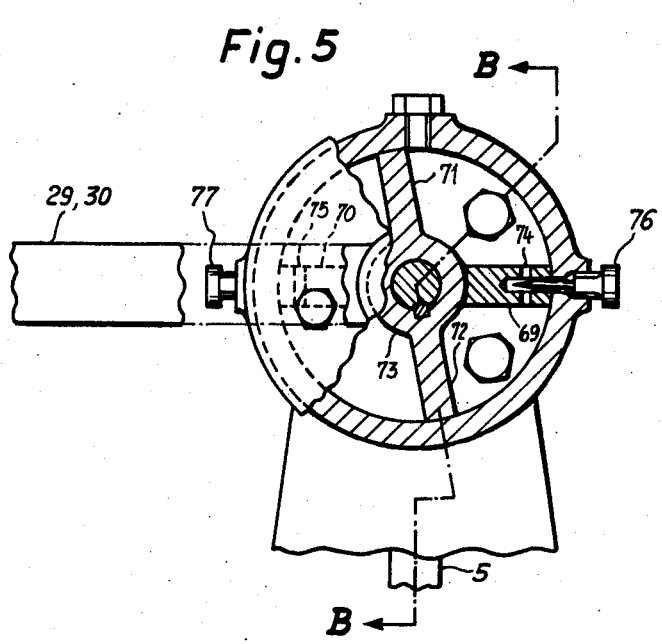

2,948,290

METHOD OF AND MECHANISM FOR THE ACTUATION OF A QUICK-ACTION SHUT-OFF DEVICE FOR PRESSURE-PIPE LINES

Hans Schnyder, Balsthal, Switzerland, assignor to Gesellschaft der Ludw. von Roll'schen Eisenwerke AG., Gerlafingen, Switzerland, a company of Switzerland Filed Feb. 21, 1955, Ser. No. 489,724

Claims priority, application Switzerland Feb. 22, 1954

17 Claims. (Cl. 137—10)

The present invention relates to a method of and mechanism for actuating a quick-action shut-off device for pressure-pipe lines, in particular to a method and mechanism of which the operation is purely mechanical and does not require any pneumatic, hydraulic or electric means.

It is the main object of this invention to control large pressure-pipe lines, in particular of hydraulic power stations, which while it will not respond either to normal stationary flow in the line or to the changes in the flow rate usual in operation—by way of example, when an additional turbine is started—causes the quick-action shut-off device to be actuated when the temporal change in the flow rate, i.e. acceleration of the flow, reaches a value which points to a pipe burst. Methods and mechanisms having this object are known but they usually operate with means other than purely mechanical, which renders difficult their operation without supervision in remote localities and increases the incidence of breakdowns.

Conversely, the present invention utilizes only purely mechanical means and relates to a method of actuating a quick-action shut-off device for a pressure-pipe line controlled by the flow of liquid in the said line, the said flow acting on at least one displaceable member by moving same, against the action of a restoring force, from its inoperative position to an extent depending on the flow rate. The invention is characterized by the fact that the actuating mechanism for the quick-action shut-off device is operated both at a predetermined extreme position of the displaceable member and when a certain displacement speed in the direction of this extreme position is exceeded.

The mechanism enabling the method to be applied is characterized by at least one swivel arm having a baffle plate operating as the displaceable member, the said arm being swivellable about an axis over an angular range of displacement and carrying a lever arm acted upon by a return force, and further by an actuating mechanism released by a control member which is placed into releasing position under the action of the swivel arm both when the extreme position in the angular range of displacement is reached and under the action of an intermediate member which responds only when a predetermined value of the angular velocity of displacement is exceeded.

A number of embodiments of the invention are described in greater detail in conjunction with the attached drawings, in which:

Fig. 1 is a side view of an embodiment of the mechanism according to this invention;

Fig. 2 is a plan view of the mechanism according to Fig. 1;

Fig. 3 is a view in the direction of flow, partly in section, of the mechanism according to Fig. 1;

Figs. 4 and 5 are longitudinal and cross sections respectively of an oil dashpot along lines B—B and A—A respectively;

Fig. 8 is a side view of a further embodiment of the mechanism according to this invention;

Fig. 9 is a plan view of the mechanism according to Fig. 8;

Fig. 10 is a view in the direction of flow, in section along line C—C, of the mechanism according to Fig. 8, and Fig. 11 is a cross section along line D—D of a retarding member of the mechanism according to Figs. 8 to 10 inclusively.

Figure 6:
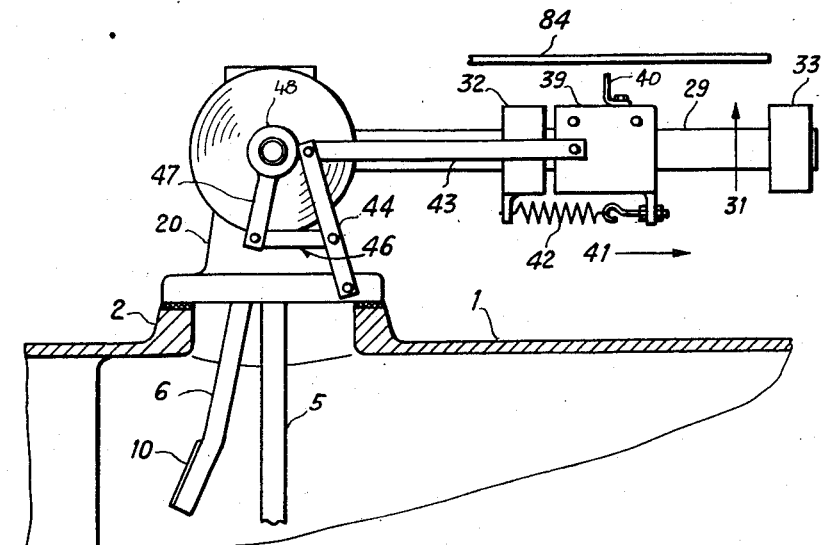
Figs. 6 and 7 are elevational and plan views respectively of a modification of the mechanism according to Figs. 1 and 2.

The embodiment of the mechanism according to the present invention shown in Figs. 1 to 3 inclusively is designed to control a hydraulic supply line 1; it is attached to a flange ring 2 by means of screw 3 and sealed against water under pressure. The flange ring 2 encloses an opening 4 in the line 1 through which the two feeler members of the apparatus, here shown as two swivel arms 5 and 6 respectively, project into the path of the water flowing through supply line 1 in the direction of arrow 7. A deflecting plate 8 is arranged in front of the swivel arms 5, 6 relatively to the direction of flow in order to keep all foreign matter away from these two feeler members. The two swivel arms 5, 6 are here shown as having unequal lengths, which is a preferred but not a necessary arrangement, and each carries a baffle plate 9 and 10 respectively here again shown as having unequal areas. Suitable selection of the length of the swivel arms 5, 6 relative to their common axis 11 and of the area of the baffle plates 9, 10 enables the torque exerted on the swivel arms 5, 6 by the flow relative to the axis 11 to be varied within wide limits and adjusted to conditions from time to time prevailing. In the embodiment according to Figs. 1 to 3, the torque exerted on the swivel arm 5 is substantially larger than that of the swivel arm 6.

The swivel arms 5, 6 are firmly connected to pivots 16 and 17 respectively by means of eyes 12, 13 and keys 14 and 15. These pivots are arranged coaxially with the axis of rotation 11 but are rotatable independently of one another. The pivots 16, 17 are arranged in bushes 18 and 19 respectively provided on either side of the housing 20. This housing 20 is provided with a fully enclosed interior chamber 21 which communicates, by the opening 4, with the supply line 1 in a downward direction only, and therefore requires to be pressure sealed. For this reason chamfered edges 22 and 23 respectively are provided on the pivots 16, 17, which edges rest against conical faces in the bushes 18 and 19 respectively in the manner of a valve seat. Axial pressure on the two pivots 16, 17 is exerted by a pressure spring 24 arranged in an axial bore 25 of the pivot 16 and bearing against a projection 26 of the pivot 17 extending into the bore 25. The bore 25 further communicates with the chamber 21 via openings (not shown) and is therefore filled with pressure water while in operation, which increases axial pressure of the conical edges 22, 23 against the sealing surfaces of the bushes 18 and 19 respectively. This provides a stuffing-box type seal for the pivots 16, 17 extending from the chamber 21. This stuffing-box type arrangement, while forming a preferred embodiment, may be replaced by other known members (such as sleeves, expansion pipe, O-ring).

Rigidly attached to the pivot 16 outside the housing 20 by means of pin 27 is a hub 28 of the bar 29 which owing to the cranked portion 30 forms a horizontal arm in the central plane of the mechanism normal to the supply line 1. If the swivel arm 5 moves in the direction of arrow 7 under the action of the flow, the horizontal arm 29 is lifted via pivot 16 in the direction of arrow 31. As shown in Fig. 1, swivel arm 5 and the horizontal arm 29 enclose an angle of approximately 90°.

Attached to bar 29 are front and rear stop blocks 32 and 33 respectively. These two blocks 32 and 33 each carry a bolt 34 and 35 respectively serving as guides for a transversely arranged rack 36 and for the spiral springs 37 and 38 respectively. Springs 37, 38 normally force the rack 36 against the heads of the two bolts 34, 35. Between the stop blocks 32, 33 a sliding weight 39 is longitudinally displaceable on rod 29 and provided with an upwardly extending lug 40 carrying a transverse latch extending across the rack 36 and normally engaging between two of its teeth. The sliding weight 39 is therefore locked against displacement along bar 29 in the direction of arrow 41 while the rack 36 engages the heads of bolts 34, 35 under the action of the springs 37, 38 as the steep tooth flanks lock the transverse latch on lug 40; but a movement in the direction opposite to arrow 41 is possible. The rear stop block 33 at the same time forms an abutment for the sliding weight 39.

Two different forces are exerted on sliding weight 39 which tend to displace it along the bar 29. One of these displacing forces is exerted by the spiral spring 42 pulling the sliding weight 39 in the direction towards the stop block 32, i.e. opposite the direction of arrow 41. The second displacing force is created by lever 43 forming a linkage together with the lever 44 swivelled on the fixed pivot 45, and levers 46 and 47. This linkage is arranged on pivot 17 by means of hub 48 and pin 49 and actuated via the said pivot 17 by the swivel arm 6. The swivel arm 6 tends, under the action of the pressure exercised on baffle plate 10, to move in the direction of arrow 7, which results in an adjusting force proportionate to the leverage exerted on lever 43 in the direction of arrow 41, i.e. an adjusting force in the direction opposite to that of the action of spring 42. The linkage 43 through to 48 is here formed so as to step up travel while stepping down power, which while forming a preferred arrangement is not an essential feature. As stated above, the adjusting force in the direction of arrow 41 exerted by lever 43 even when exceeding the return force of spring 42, cannot result in a displacement of the sliding weight 39 while its transverse latch 40 engages with rack 36.

Parallel with the horizontal arm formed by the bar 29 is disposed the releasing lever 50 arranged on pivot 51 and pivotally attached with the latter in a bearing block 52. In idle position, the releasing lever 50 rests against a stop 53 formed on the housing 20 against which it is forced by the weight 54. Arranged on the lever 50 is a pressure pin 55 which moves a little distance in the direction of arrow 56 when the releasing lever 50 is lifted off the stop 53 thus causing the operation of the quick-action shut-off device (such as a throttle valve) (not shown) through an amplifying means, e.g. a tripping spring or a tilting lever, but not before the releasing lever 50 has performed its predetermined angular movement around its pivot 51. The releasing lever 50 is connected with the horizontal arm of the swivel arm 5, i.e. with the bar 29, 30 via a coupling unit 57 forming an essential feature of the mechanism according to this invention. This coupling unit 57 does not form a rigid connection between the bar 29 and the releasing lever 50, but is arranged in such a manner that it can transmit power impulses and only such impulses of which the flank gradient exceeds a predetermined and adjustable minimum value. Impulses of lesser gradients as well as a constant force cannot, therefore, be transmitted by the horizontal arm to the releasing lever 50 via the coupling unit 57 but will be absorbed within the said coupling unit 57.

The embodiment of the coupling 57 shown in Fig. 1 consists of an oil dashpot comprising a fully enclosed oil-filled cylinder 58 along which a piston 59 is suctionally displaceable at a rate depending on the volume of oil that can flow between the two openings 60, 61 and the side channel 62. This compensating oil flow can be adjusted by means of the adjusting screw 63. The cylinder 58 is connected with the rail 29 via a joint and the piston 59 is similarly connected via a joint with the releasing lever 50. If the compensating oil flow in the side channel 62 is substantially throttled by means of screw 63, power impulses having a relatively small flank gradient will be transmitted, i.e. a relatively slow rise of the bar 29 and the cylinder 58 is transmitted to the piston 59 and the releasing lever 50. Conversely, if the oil compensation is rapidly operative through the wide-open side channel 63, a power impulse of a steep flank gradient, i.e. a relatively rapid rise of the bar 29 is required for the piston and the releasing lever 50 to be displaced from their idle position. Apart from the compensating oil flow in the coupling unit 57, the response of the releasing lever 50 also depends on the pressure it exerts on the rest 53, i.e. on the position of weight 54. It is thereby possible to adjust the coupling between the releasing lever 50 and the horizontal arm of the swing arm 5 within predetermined limits by means of the adjusting screw 63 and the weight 54.

The releasing lever 50 is equipped with a downwardly extending tongue 64 directed towards a transverse latch 65 at the exact centre of the rack 36. In inoperative position of the mechanism as shown in Fig. 1, the said tongue rests at a predetermined distance from the said transverse latch 65. The tongue 64 is designed as a stop for the transverse latch 65 in the event of bar 29 and rack 36 being raised slowly while the releasing lever 50 remains in inoperative position, which causes the rack 36 to be displaced on its guide bolts 34, 35 against the action of springs 37, 38 and the transverse latch 40 to be disengaged from the rack 36.

In normal operating position, i.e. when the flow in the supply line 1 is steady, the swivel arm 5 is always in the substantially vertical position shown in Fig. 1 and the sliding weight 39 in a position along the length of the bar 29 so that the torque around axis 11 exerted by the flow is just compensated by the counteracting torque of the sliding weight 39. If a sudden increase in the flow rate, i.e. an acceleration in the supply line 1 occurs in this inoperative position, which acceleration remains within the limits predetermined for operation e.g. when an additional turbine is started, the swivel arm 5 moves in the direction of arrow 7 and the horizontal arm 29 in the direction of arrow 31 at an angular velocity depending on the acceleration of flow. Coupling unit 57 and the weight 54, are, however, set in such a manner that the force exerted on the piston 59 does not suffice to raise the releasing lever 50 from its rest 53 so that no displacement of the pressure pin 55 occurs. Furthermore, the tongue 64 remains in inoperative position and, as soon as the swivelling motion of the horizontal arm 29 has reached a certain value, causes the rack 36 to be forced towards the bar 29 along its guiding bolts 34, 35 and the transverse latch 40 of the sliding weight 39 to be released. This sliding weight 39, however, is under a displacing force in the direction of arrow 41 exerted by linkage 43 through to 48 in accordance with the increase in the torque at the swivel arm 6 caused by the increased flow rate. The sliding weight is therefore displaced in the direction of arrow 41 until the displacing force is substantially balanced by the spring 42. At the same time, however, the torque of the sliding weight 39 on rail 29 is increased as well and causes the swivel arm 5 to be returned into a substantially vertical position. Simultaneously with the downward motion of the horizontal arm 29 in a direction opposite to that of arrow 31, the rack 36 can return into its idle position so that the transverse latch 40 again engages thereby locking the sliding weight in its new inoperative position. This again restores idle position for the new stationary flow condition, which position is distinguished from the first idle position merely by the fact that the swivel arm 6 has now assumed another position relative to the swivel arm 5 and that the sliding weight 39 has been displaced along the bar 29 in the direction of arrow 41.

If the increase in the flow rate in the supply line 1 above described is cancelled, e.g. by stopping a turbine, the torque in respect of the two swivel arms 5, 6 is reduced and the horizontal arm 29 moves against the direction of the arrow 31. At the same time the return force of the spring 42 exerted on the sliding weight 39 predominates and returns the said weight into its former position, which is not prevented by rack 36 and the transverse latch 40 because the teeth of rack 36 are designed as saw-teeth so that the transverse latch 40 may slide across them in a direction opposite to that of arrow 41. With the return of the sliding weight 39 into its previous position, its counter-torque against the torque exerted by the swivel arm 5 is reduced, so that the swivel arm 5 will again be returned into its substantially vertical position and the previous inoperative position of the mechanism is again restored.

Conversely, if a sudden increase in the flow rate occurs, which exceeds the values predetermined for normal operation, e.g. when a pipe bursts, the horizontal arm 29 of the swivel arm 5 is raised considerably more rapidly and the power impulse exerted on the cylinder 58 of the coupling unit 57 cannot be absorbed by the oil dashpot. The steeper flank gradient of the impulse causes a force to be exerted on the piston 59 which suffices for the releasing lever 50 to be raised off its rest 53. This will also raise the tongue 64, and the transverse latch 40, which is normally released by the said tongue, and the sliding weight are not released so that the compensating action of the swivel arm 6 via the linkage 43 through to 48 on the horizontal arm 29 cannot become operative. The arm 29 is therefore further raised in the direction of arrow 31 together with the releasing lever 50 until the displacement in the direction of arrow 56 of the pressure pin 55 caused by the said movement will cause the quick-action shut-off device, such as a throttle valve for the supply line 1, to be actuated.

The position of the supporting block 33 on the bar 29 is such as to ensure that the sliding weight 39 is forced back to the said block 33 when the supply line 1 is under full load, i.e. when the flow has the greatest velocity possible in operation (all turbines under full load), by the linkage 43 through to 48 in accordance with the torque exerted on the swivel arm 6 depending on the flow rate.

When a further increase of the flow rate of any magnitude occurs (burst of pipe under full load) the compensating member is blocked by the supporting block 33 so that when the bar 29 is sufficiently swivelled in the direction of arrow 31, the rack 36 releases the transverse latch 40 on the sliding weight 39 by means of the tongue 64, while this sliding weight cannot be further displaced in the direction of arrow 41. This causes the bar 29 to be moved in the direction of arrow 31 upon the least increase in the rate, even if such increase is below the minimum value set on the coupling unit 57, the releasing lever 50 with the bar 29 being moved in the direction of arrow 31 after the two springs 37, 38 have been completely compressed, so that the release of the quick-action shut-off device of the supply line is initiated through the pressure pin 55.

In operation of the mechanism designed in accordance with Figs. 1–3 it has been found that impacts and vortex filaments may, under certain conditions, become operative on the baffle plates 9 and 10 on the swivel arms 5 and 6 respectively. Such impacts cause the mechanism to operate unevenly and are undesirable. The effect of such impacts on the horizontal arm 29 of the first swivel arm 5 and on the linkage 43 through to 48 of the second swivel arm 6 can be eliminated by an oil dashpot arranged on each of the pivots 16 and 17. According to the magnitude of the said impacts such an oil dashpot may be provided on only the first pivot or on both pivots.

Figs. 4 and 5 show an embodiment of a suitable dashpot on pivot 16 of the swivel arm 5. This pivot 16 is here extended and projects through the dashpot cell formed by the base portion 66 and the cover 67. The base portion 66 together with an extension 68 also forms the bearing bush for the pivot 16 and is attached to the side wall of the housing 20. The end of the pivot 16 projecting from the cover 67 carries the hub 28 for the horizontal arm 29.

The interior of the dashpot cell is subdivided into upper and lower chambers by the separating walls 69 and 70, rotating radial vanes 71 and 72 respectively moving in the said chambers. These vanes are arranged on two sides of a bush 73 keyed to the pivot 16 and are therefore reciprocated when the swivel arm 5 is adjusted. The upper and lower chambers of the cell are filled with oil and communicate via channels 74 and 75 in the separating walls 69 and 70 respectively. By means of adjusting screws 76 and 77 respectively the unrestricted passage area of the two channels 74 and 75 respectively can be reduced. The upper and lower chambers are filled with oil and vented through suitable openings, which can be sealed. The interior of the dashpot is sealed by means of sleeves (or O-rings) 78 and 79. Furthermore, the extension 68 is provided with an annular channel 80 having a drain passage 81, so that percolating water and oil from the interior of housing 20 and the dashpot respectively can be removed.

In the idle position of the swivel arm 5 (Fig. 1) the rotating vanes 71, 72 are substantially in the position shown in Fig. 5. Each sudden swivelling motion of the swivel arm 5 owing to an impact, vortex filament or the like is damped by the unrestricted passage area of the oil openings 74, 75 adjusted accordingly, while no marked resistance is exerted when a less sudden swivelling motion is caused. Damping is therefore adjustable by the two adjusting screws 76, 77 and set at a lower value in operation of the mechanism according to Figs. 1–3 than damping in the oil dashpot 57 (Fig. 1).

The dashpot described in conjunction with Figs. 4 and 5 may, if properly dimensioned and set, replace the coupling unit 57 provided according to Fig. 1, which transmits only power impulses. Such an embodiment is illustrated in Figs. 6 and 7, the releasing mechanism for the quick-action shut-off device actuated by the horizontal arm 29 when displaced in the direction of arrow 31 not being shown since it may be designed as shown in Figs. 1–3 or in a different manner suitable for the purpose.

Figure 7:
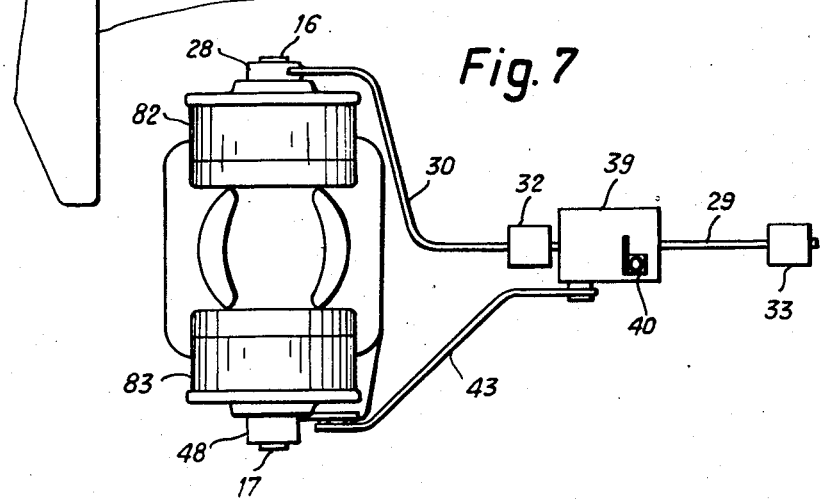

In the embodiment according to Figs. 6 and 7 both pivots 16, 17 are equipped with an oil dashpot 82 and 83 respectively. The said dashpots are here designed in the manner illustrated in Figs. 4 and 5, but may be formed according to another design. Otherwise the mechanism corresponds exactly to that shown in Figs. 1–3 with the exception of the units here unnecessary, 34 through to 38 and 50 through to 65, since the latch 40 on the sliding weight 39 directly actuates the releasing mechanism, e.g. its lever 84 (Fig. 6), as soon as the angular displacement of the horizontal arm 29 in the direction of arrow 31 is sufficient therefor. In order to ensure an angular displacement sufficient for the actuation of the releasing mechanism of the horizontal arm 29 only when the acceleration of the flow rate exceeds a predetermined maximum value, a differential adjustment of the two dashpots 82 and 83 is required.

Dashpot 82 co-operating with the swivel arm 5 is, by way of example, adjusted so that it compensates the undesirable impacts of the flow exerted on the baffle plate 9, i.e. that it strongly damps power impulses of high flank gradients and small amplitude. Conversely, power impulses having large amplitudes, when exceeding a predetermined flank gradient, are transmitted to the horizontal arm 29 and cause it to be angularly displaced in the direction of arrow 31 unless some counter-action occurs. While the sliding weight 39 is positioned intermediately of the two stops 32, 33 such counter-action occurs when it is displaced in the direction of arrow 41 via the linkage 43 through to 48 by the swivel arm 6. The oil dashpot 83 acting upon the swivel arm 6 is adjusted in such manner that the displacement of the sliding weight 5 resulting from an acceleration of flow within the operationally admissible interval in the range of the normal flow rate occurs rapidly enough to cause the torque in the direction of arrow 31 exerted on the horizontal arm 29 to be compensated at once, i.e. to prevent an angular displacement thereof and actuation of the releasing mechanism. When the acceleration of the flow is higher than would correspond to the predetermined maximum value, i.e. when the flank gradient of the power impulses exerted on the swing arms 5 and 6 is correspondingly higher, the differential setting of the oil dashpots 82 and 83 results in a delay of compensation by the sliding weights 39 and the angular displacement of the horizontal arm 29 does not suffice to actuate the releasing mechanism 84 via the latch 40.

If the sliding weight 39 engages the supporting block 33 when the swivel arm 5 is in idle position (stationary flow in the supply line)—when all turbines operate under full load—a further compensation of the increase of torque 16 is impossible when the flow rate 25 undergoes a further increase, irrespective of the acceleration with which such increase occurs (pipe burst under full load). Therefore, the bar 29 is in this case immediately swivelled out in the direction of arrow 31 and the releasing mechanism 84 of the quick-action shut-off device actuated through the latch 40.

Figs. 8–11 show another embodiment of the apparatus according to this invention which is arranged on a flange ring 2 welded to the supply line 1 by means of screws 3 and sealed against pressure water. The flange ring 2 encloses an opening 4 in the supply line 1 through which the swivel arm 90 with the baffle plate 91 projects into the flow through the supply line 1 in the direction of arrow 7. A deflecting plate 8 is arranged in front of the swivel arm 90 relative to the direction of flow 7 so that any foreign matter floating in the water may be deflected from the said swivel arm. The swivel arm 90 is rigidly connected to the shaft 94 by means of hub 92 and key 93. Shaft 94 is supported in the bushes 95 and 96 which are in turn arranged in the housing 97. This housing is provided with a fully enclosed interior chamber 98 communicating via the opening 4 with the supply line 1 in a downward direction only and thus requiring to be pressure sealed. For this reason, the bush 95 is provided with a closed base and the hollow chamber 99 above channel 100 communicates with the chamber 98 so that an axial pressure is created which acts on shaft 94 in the direction of arrow 101. This axial pressure is taken up by the bush on the shoulder 102 of shaft 94. Inserted in this bush 96 is a seal operative against water pressure. This seal may be left out if the shoulder is formed conically so as to create a valve-seat type metallic seal.

Rigidly connected with the shaft 94 projecting through the bush 96 by means of key 106 is the rotating vane 104 of the delaying member 105 so that the said vane 104 will follow every movement of the swivel arm 90. This vane 104 moves in the fully enclosed oil-filled housing 107 of the delaying member 105 which in turn is rotatably arranged with its base on an eye 108 projecting from bush 96 and with its cover 109 on shaft 94. The interior chamber of this housing 107 is subdivided into two chambers by means of the two walls 110 and 111 integral with the cover 109, these two chambers directly communicating via the bores 112 and 113. Adjusting pins 114 and 115 enable the unrestricted passage area of the bores 112 and 113 to be reduced. Arranged on the rotating vane 104, which again subdivides the two chambers into two sub-chambers, are the two check valves 116 and 117 which remain closed when the vane 104 rotates in an anti-clockwise direction so that the oil will flow through the two bores 112 and 113, and will open on clockwise rotation under the oil pressure caused so that oil compensation will partly occur through these valves 116 and 117. Hence such rotation will occur more rapidly owing to the lesser resistance, which is a preferred, but not an essential, feature of the design. In the base of the housing 107 and the cover 109 seals 118 and 119 are incorporated for the oil in the interior of housing 117.

Outside the cover 109 a key rigidly holds the lever 121 on the shaft 94. Arranged on this lever is handle 122 displaceable between the two points 123 and 124 to adjust the pull of spring 125 rigidly attached to this handle, and arm 126, which is arranged on housing 97. When the angular displacement of the lever 121 in the direction of arrow 137 is large enough, this lever will engage the adjustable stop bolt 127 arranged on the cover 109 of the delaying member 105.

Rigidly attached to the housing 107 of the delaying member 105 is the housing lever 128 on which the counter weight 129 is slidably arranged and which rests on the stop 130. In addition, the cam 131 is rigidly attached to the housing 107, on which the releasing rail 132 is movably attached by means of bolt 133.

If one of two turbines connected to a supply line 1 is operated under full load and the other is stopped, the water will flow through the supply line 1 at a mean rate. By displacing cam 122 on the lever 121 the pull of spring 125 is so adjusted on assembly that the swivel arm 90 will move in the direction of the arrow 134 to approximately one-half of its angular range of displacement under the action of the impact pressure exerted on the baffle plate 91 by the water flowing through supply line 1.

When the second turbine is started in addition, the flow rate of the water in supply line 1 is increased. This causes the pressure exerted by the water flow upon baffle plate 91 of the swivel arm 90 to be increased in accordance with the higher flow rate and the swivel arm 90 will move farther in the direction of arrow 134. At the same time the rotating vane 104 in housing 107 of the delaying member 105 will rotate so that an oil volume corresponding to the rotation will be forced through the bores 112 and 113. The throttle pins 114 and 115 and the weight 129 arranged on the housing lever 128 are set so that the housing 107 with the cover 109 will not follow the rotation in the direction of arrow 135 owing to the resistance oil pressure encounters in the throttled bores 112 and 113.

When the second turbine is stopped, the flow rate in the supply line 1 is again reduced. This also reduces the impact pressure exerted on the baffle plate 91 of the swivel arm 90, the rotating vane 104 of the delaying member 105 being returned via lever 121 and the shaft 94 in clockwise direction under the action of spring 125. Oil compensation during this return movement is effected partly by the check valves 116 and 117. During this operation, too, the housing 107 of the delaying member 105 rests on the stop 130. If a pipe bursts, the acceleration of the water flowing through the supply pipe 1 is larger than when an additional turbine is started, so that the rotating vane 104 in the delaying member 105 is rotated more rapidly in an anti-clockwise direction. Owing to the rigid setting of the throttle pins 114 and 115, the oil cannot pass into the adjoining chambers at a correspondingly increased rate so that the housing 107 with cover 109 is displaced in the direction of arrow 135 by the oil overpressure building up so that the pulling power can be taken off the releasing bar 132 necessary to initiate the closing movement of the automatic pipe shut-off device (e.g. throttle valve), which is advantageously performed via an amplifying means, such as a tripping spring under tension or a tipping lever.

The stop bolt 127 on the nose 136 rigidly arranged on the cover 109 of the delaying member 105 is adjusted so that the lever 121 is moved towards the said bolt 127 in the direction of arrow 137 when the flow rate is at the maximum allowed for the supply line 1. When the flow rate in the supply line 1 increases further, which can, in the present case, only occur in the event of a pipe bursting, the housing 107 of the delaying member 105 is mechanically displaced by the lever 121 engaging the stop bolt 127, so that the releasing motion is effected in the direction of arrow 135 independently of the action of the delaying member 105.

In order to damp shocks caused by pressure surges and vortex filaments on the baffle plate 91 of the swivel arm 90, an oil dashpot according to Figs. 4 and 5 may be arranged on the side of bush 95 on the housing 97.

Having now particularly described and ascertained the nature of my said invention and in what manner the same is to be performed, I declare that what I claim is:

1. Control means for an automatic cutoff mechanism of a pressure pipe for a flowing medium, comprising a lever arm responsive to the flow of said medium through said pipe and arranged for pivotal movement about an axis, a pivotally mounted control member adapted upon being displaced through a predetermined angle to actuate said automatic cutoff mechanism, coupling means interconnecting said lever arm and said control member and operable to permit relative motion therebetween in inverse proportion to the angular velocity of pivotal movement of said lever arm about said axis, and means operatively connected to said lever arm to resist angular displacement of said lever arm, said last-named means being responsive to operation of said coupling means to ensure that angular displacement of said lever arm is resisted at low angular velocities thereof while ensuring that said control member is pivoted to actuate said automatic cutoff mechanism only at higher angular velocities of said lever arm.

2. Control means for an automatic cutoff mechanism of a pressure pipe for a flowing medium, comprising first and second lever arms responsive to the flow of said medium through said pipe and arranged for pivotal movement about respective axes, a horizontal arm coupled to and angularly displaceable in response to the angular displacement of said first lever arm, a weight adjustably disposed on said horizontal arm for resisting the angular displacement thereof, a linkage coupling said weight to said second lever arm and tending to adjust the position of said weight on said horizontal arm to increase the resistance to the angular displacement thereof, a pivotable control arm adapted upon being displaced through a predetermined angle to actuate said automatic cutoff mechanism, coupling means interconnecting said horizontal arm and said control arm and permitting relative motion therebetween in inverse proportion to the angular velocity of said horizontal arm, locking means to normally lock said weight in position on said horizontal arm, and means responsive to relative motion between said horizontal and control arms for rendering said locking means ineffective to permit adjustment of said weight and thereby a corresponding variation of the resistance to said angular displacement of said horizontal arm, said coupling means being responsive to a predetermined angular velocity of said horizontal arm for substantially preventing relative motion between said horizontal arm and said control arm, whereby the latter is pivoted into position to actuate said automatic cutoff mechanism.

3. Control means as claimed in claim 2, said first and second lever arms being of different lengths, whereby said weight and said horizontal arm are acted upon by different torques.

4. Control means as claimed in claim 3, said coupling means comprising a fluid pressure unit including a piston member and a cylinder member therefor, one member of said unit being coupled to said horizontal arm, the other member of said unit being coupled to said control arm.

5. Control means as claimed in claim 4, said piston member dividing said cylinder member into two chambers, said unit including means establishing a variable communication between said chambers.

6. Control means as claimed in claim 5, said locking means comprising a resiliently supported saw-toothed blade normally engaging said weight so as to prevent displacement thereof, said control arm being provided with an abutment for disengaging said blade from said weight in response to relative motion between said control arm and said horizontal arm.

7. Control means as claimed in claim 6, said horizontal arm being provided with an end stop for preventing displacement of said weight beyond a position at which the normal full load of the pipe is counterbalanced.

8. Control means as claimed in claim 7, further comprising a spring connected to said weight so as to oppose displacement thereof in one direction.

9. Control means as claimed in claim 8, further comprising a hollow bell supporting said first and second lever arms coaxially with one another and in its interior, said bell being in fluid tight communication with the pipe.

10. Control means as claimed in claim 9, further comprising a shield in said pipe for preventing foreign matter in said medium from striking said lever arms.

11. Control means as claimed in claim 10, further comprising baffle plates of different areas coupled to said lever arms.

12. Control means for an automatic cutoff mechanism of a pressure pipe line, comprising a control member arranged for displacement to a predetermined position for actuating said automatic cutoff mechanism, at least one lever arm connected to said control member and extending into said pipe line and pivotable about an axis through an angular range of displacement, said lever arm being displaced in response to the rate of flow of a medium in said pipe line for moving said control member into said predetermined position when the rate of flow of said medium reaches a predetermined maximum, and intermediate means connected between said lever arm and said control member for causing said control member to assume said predetermined position when the angular velocity of said lever arm exceeds a predetermined value in response to an excessive rate of change of flow of said medium, to thereby effect an actuation of said automatic cutoff mechanism prior to the rate of flow of said medium reaching said predetermined maximum.

13. Control means for an automatic cutoff mechanism of a pressure pipe line, comprising a control member arranged for displacement to a predetermined position for actuating said automatic cutoff mechanism, at least one lever arm connected to said control member and extending into said pipe line and pivotable about an axis through an angular range of displacement, said lever arm being displaced in response to a change in rate of flow of a medium in said pipe line for moving said control member into said predetermined position when the rate of flow of said medium reaches a predetermined maximum, and intermediate means connected between said lever arm and said control member and including acceleration sensitive means and transmission means controlled by said acceleration sensitive means, said transmission means displacing said control means into said predetermined position in response to a rate of change of flow of said medium exceeding a predetermined value being sensed by said acceleration sensitive means, to thereby effect an actuation of said automatic cutoff mechanism prior to the rate of flow of said medium reaching said preterminated maximum.

14. A method of controlling the flow of a medium through a pipe, comprising the steps of sensing a change in said flow of said medium in said pipe, producing a first physical displacement proportionate with a positive rate of change of flow sensed in said medium to thereby obtain as a measure of rate of change of said flow of said medium an indication of the velocity of said first physical displacement, converting said first physical displacement into a second physical displacement when said velocity of said first physical displacement exceeds a predetermined value, and directing said second physical displacement to cut-off said flow of medium through said pipe in accordance with an excessive positive rate of change of flow therein.

15. A method of controlling the flow of a medium through a pipe, comprising the steps of sensing a change in said flow of said medium in said pipe, producing a physical displacement proportionate with a positive rate of change of flow and a concurrent increase in rate of flow, respectively, sensed in said medium to thereby obtain as a measure of rate of change of said flow of said medium an indication of the velocity and of the size, respectively, of said first physical displacement, converting said first physical displacement into a second physical displacement when said velocity of said first physical displacement exceeds a predetermined value, and directing said second physical displacement to cut-off said flow of medium through said pipe in accordance with an excessive positive rate of change of flow therein.

16. A method of controlling the flow of a medium through a pipe, comprising the steps of sensing a change in said flow of said medium in said pipe, producing a physical displacement proportionate with a positive rate of change of flow and a concurrent increase in rate of flow, respectively, sensed in said medium to thereby obtain as a measure of rate of change of said flow and of said increase in rate of flow of said medium an indication of the velocity and of the size, respectively, of said first physical displacement; converting said first physical displacement into a second physical displacement when said velocity of said first physical displacement exceeds a predetermined value, and directing said first physical displacement when said velocity thereof is below said predetermined value and said size thereof reaches a predetermined maximum to cut-off said flow of medium in said pipe in accordance with an excessive rate of flow therein.

17. Control system for controlling the flow of a medium through a pipe, comprising means for sensing a change in the flow of a medium in a pipe, means for producing a first physical displacement proportionate with a positive rate of change of flow sensed in said medium to obtain as a measure of said rate of change of said flow of said medium an indication by said first recited means of the velocity of said first physical displacement, means for converting said first physical displacement into a second physical displacement when said velocity of said first physical displacement exceeds a predetermined value, and means for employing said second physical displacement to cut-off said flow of medium through said pipe in accordance with a predetermined excessive positive rate of change of flow therein.

References Cited in the file of this patent

UNITED STATES PATENTS

| | | |
|---|---|---|
| 1,050,646 | Grove | Jan. 14, 1913 |
| 1,466,412 | Samain | Aug. 28, 1923 |
| 1,557,863 | Mrvosh | Oct. 20, 1925 |
| 2,694,408 | McRae | Nov. 16, 1954 |

FOREIGN PATENTS

| | | |
|---|---|---|
| 287,649 | Great Britain | Mar. 29, 1928 |